J. COHN.
HUMIDIFIER AND FUMIGATOR.
APPLICATION FILED JAN. 29, 1916.

1,202,485.

Patented Oct. 24, 1916.

Witnesses:
C. H. Roessner
R. Burkhardt

Inventor:
Jack Cohn
By Albert C. Bell
Atty

UNITED STATES PATENT OFFICE.

JACK COHN, OF CHICAGO, ILLINOIS, ASSIGNOR OF ONE-HALF TO ARTHUR MOURANT, OF CHICAGO, ILLINOIS.

HUMIDIFIER AND FUMIGATOR.

1,202,485.      Specification of Letters Patent.      Patented Oct. 24, 1916.

Application filed January 29, 1916. Serial No. 74,959.

*To all whom it may concern:*

Be it known that I, JACK COHN, a citizen of the United States, residing at Chicago, in the county of Cook and State of Illinois, have invented a new and Improved Humidifier and Fumigator, of which the following is a specification.

The object of my invention is to construct a humidifier and fumigator for vaporizing volatile oils for disinfecting and fumigating purposes and also for humidifying the air in inclosed places.

Figure 1:
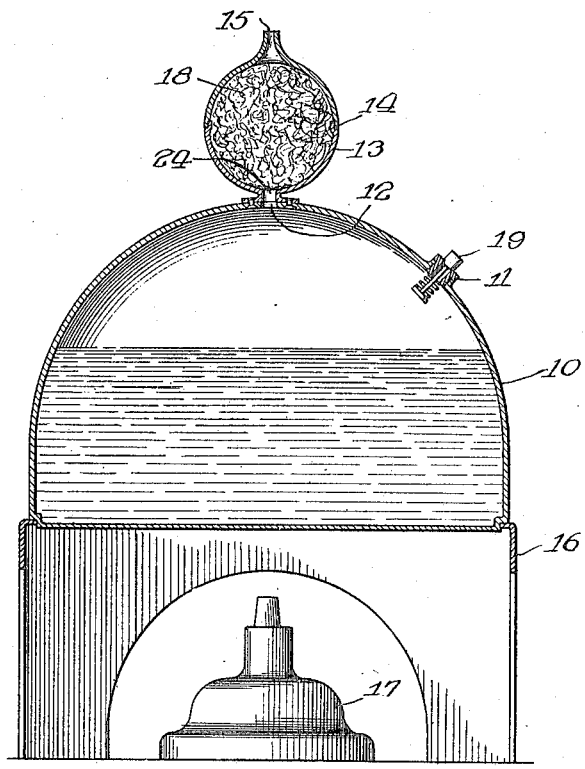
Figure 2:
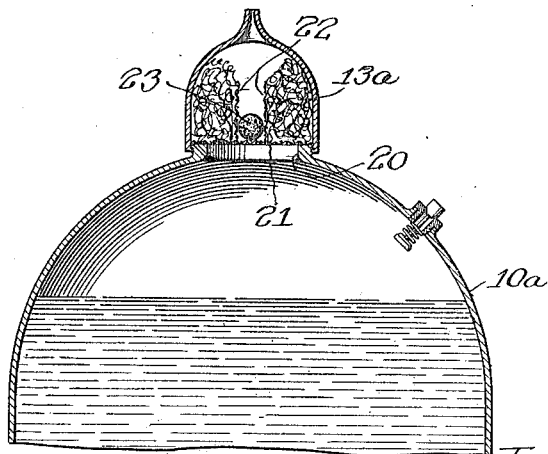

My invention is characterized by simplicity of construction and effectiveness of operation and will best be understood by reference to the accompanying drawings, which are as follows:

Figure 1 shows the preferred form of my construction in vertical central sectional view, and Fig. 2 shows in a view similar to Fig. 1 the upper portion of a modified form of my invention.

Similar numerals refer to similar parts throughout the several views.

As shown in Fig. 1, the device consists of a hemispherical tank 10 entirely closed except where it is provided with a screw plug 11 for filling the tank to a desired level, and at its top portion with an outlet 12 communicating with a hollow receptacle 13. The receptacle 13 is shown as spherical, although it may have any desired conformation, and while it is shown as riveted to the tank 10 it may be secured thereto in any desired manner, as by soldering or brazing. The receptacle 13 is preferably made in two parts as indicated, which are screwed together at 14, the upper portion of said receptacle being provided with an outlet nozzle 15 of small cross section. The tank 10 is supported on a tripod 16 at a suitable height so that a lamp 17 may be located beneath the tank 10 for heating the water in said tank. While I have shown in Fig. 1 a lamp adapted for use with alcohol or fuel oil, it will be understood that this representation is merely diagrammatic and that I may employ any well known heating means for heating the tank, such, for example, as gas or electricity.

In carrying out my invention the tank 10 is filled to a desired level with water, preferably half or two-thirds full, and the receptacle 13 is opened and filled with absorbent cotton or similar fibrous material 18, upon which the liquid to be vaporized and mixed with the steam delivered from the apparatus is placed.

The liquid to be vaporized may be any liquid disinfectant, such for example as formaldehyde or carbolic acid, or if the device is to be used merely as a humidifier and not as a fumigator for disinfecting purposes the disinfectant is omitted and steam may be delivered along from the nozzle 15, or if preferred the steam may be perfumed by applying to the fibrous material 18 any desired essential oil from flowers or toilet water of any desired kind may be put on the fibrous material, with the effect that the steam produced by the heating of the water in the tank passing through the fibrous material picks up a part of the disinfecting or perfuming material, as the case may be, and delivers it with the steam in the form of vapor into the atmosphere, thus producing through a relatively wide zone a distribution of finely divided particles of the disinfecting or perfuming material, depending upon the use to which the device is put. The plug 11 may be provided with a safety valve 19 for guarding against the production in the tank 10 of unsafe steam pressure or pressure that is too high to properly operate the device. A screen 24 may be employed in the bottom of the receptacle 13 if desired to prevent the fibrous material from entering the inlet opening of the receptacle.

In Fig. 2 the tank 10$^a$ is of substantially the same construction as that shown as the tank 10, the principal difference being the mounting of the receptacle 13$^a$ thereon, which in this case is done by threading the lower end of the receptacle which is of cylindrical form directly upon an upwardly extending flange 20 formed on the tank 10. A horizontal screen 21 rests upon the upper end of the flange 20 to retain the fibrous material in the receptacle 13$^a$ and if desired a pocket or receptacle of screening material 22 may be supported by the screen 21 to receive disinfecting or perfuming material in solid form as shown at 23. The effect is substantially the same whether the disinfecting or perfuming material is used in liquid or solid condition since in the latter case the steam vaporizes a portion of the outside of the solid disinfecting or perfuming material and carries and distributes it as before into the air of the room.

While I have shown my invention in the particular embodiments herein described, I do not, however, limit myself to these exact constructions as I may employ equivalents thereof without departing from the spirit of my invention.

What I claim is:

In a vaporizing device, the combination of a hemispherical generator having a flat bottom and a restricted outlet opening at its apex, and a spherical container comprising two detachable halves arranged to interlock each other and mounted on said generator to receive vapor therefrom, said container having a portion formed into a pointed nozzle providing a discharge opening from said container of much smaller area than the area of the generator outlet opening, whereby, said container may be closely packed with absorbent fibrous material through which the vapor from the generator is compelled to pass and said vapor on passing from said container is forcibly projected into the atmosphere.

In witness whereof, I hereunto subscribe my name this 24th day of January, A. D. 1916.

JACK COHN.

Copies of this patent may be obtained for five cents each, by addressing the "Commissioner of Patents, Washington, D. C."